United States Patent [19]
Castore

[11] Patent Number: 5,781,297
[45] Date of Patent: Jul. 14, 1998

[54] MIXED FREQUENCY AND AMPLITUDE MODULATED FIBER OPTIC HETERODYNE INTERFEROMETER FOR DISTANCE MEASUREMENT

[75] Inventor: Glen Castore, Roseville, Minn.

[73] Assignee: M&M Precision Systems Corporation, West Carrollton, Ohio

[21] Appl. No.: 702,284

[22] Filed: Aug. 23, 1996

[51] Int. Cl.$^6$ .................................................. G01B 9/02
[52] U.S. Cl. ............................................ 356/349; 356/358
[58] Field of Search ....................... 356/349, 358, 356/351

[56] References Cited

U.S. PATENT DOCUMENTS

| | | | |
|---|---|---|---|
| 4,643,575 | 2/1987 | Hazeltine et al. | 356/351 |
| 4,733,609 | 3/1988 | Goodwin et al. | |
| 4,824,251 | 4/1989 | Slotwinski et al. | |
| 5,114,226 | 5/1992 | Goodwin et al. | |
| 5,151,747 | 9/1992 | Nourrcier | |
| 5,283,796 | 2/1994 | Fink | |
| 5,289,252 | 2/1994 | Nourrcier | |
| 5,311,353 | 5/1994 | Crawford | |
| 5,337,056 | 8/1994 | Dax | |
| 5,416,321 | 5/1995 | Sebastian et al. | 356/4.01 |

OTHER PUBLICATIONS

Imai et al., "Optical–heterodyne displacement measurement using a frequency–ramped laser diode", *Optics Communications*, Aug. 15, 1990, vol. 78, No. 2, pp. 113–117.

Kubota et al., "Interferometer for measuring displacement and distance", *Optics Letters*, May 1987, vol. 12, No. 5, pp. 310–312.

Chien et al., "Distance–and velocity–detection interferometer by using a frequency triangular–modulated laser diode", *Applied Optics*, Jun. 1, 1995, vol. 5, No. 6, pp. 2853–2855.

Economou et al., Limitations and Noise in Interferometric Systems Using Frequency Ramped Single–Mode Diode Lasers, *Journal of Lightwave Technology*, Nov. 1986, vol. LT–4, No. 11, pp. 1601–1608.

Uttam et al., "Precision Time Domain Reflectometry in Optical Fiber Systems Using a Frequency Modulated Continuous Wave Ranging Technique", *Journal of Lightwave Technology*, Oct. 1985, vol. LT–3, No. 5, pp. 971–977.

Onodera et al., "Effect of Laser–Diode Power Change on Optical Heterodyne Interferometry", *Journal of Lightwave Technology*, Apr. 1995, vol. 13, No. 4, pp. 675–681.

Everett, "Survey of Collision Avoidance and Ranging Sensors of Mobile Robots", *Robotics and Autonomous Systems 5*, 1989, vol. 5–67, pp. 5–16.

*Primary Examiner*—Frank G. Font
*Assistant Examiner*—Amanda Merlino
*Attorney, Agent, or Firm*—Rankin, Hill, Porter & Clark LLP

[57] ABSTRACT

A method and an apparatus for a precision optical distance measuring device which can be used to determine both external and internal target geometries. The beam from a frequency modulated laser diode is split into reference and target beams. A closed loop control system modulates the amplitude of the reference beam to maintain a balance between the power in the target return beam and the reference beam. This enables the sensor to operate with targets of widely varying reflectivity and across a broad range of angles of incidence of the target beam to the target. The reference and target return beams interfere at a detector producing a beat wave. The beat frequency is linearly related to the distance of the target from the sensor. The frequency of the beat wave is determined to high precision, thus giving the position to high precision.

20 Claims, 4 Drawing Sheets

MIXED FREQUENCY AND AMPLITUDE MODULATED FIBER OPTIC HETERODYNE INTERFEROMETER FOR DISTANCE MEASUREMENT

FIELD OF THE INVENTION

The invention is related to laser devices for measuring distance to a target. Specifically, the invention is related to frequency modulated heterodyne interferometers which are continuous wave laser radar devices in which the laser frequency is chirped to create a beat signal from the interference of a reference signal and a target signal that is a reflected beam from the target.

BACKGROUND OF THE INVENTION

High precision, non-contact measurement devices, having a resolution on the order of 25 to 250 nanometers, are needed to inspect high precision machined components such as thread gages, optical lenses, gears, and splines. In many cases, the features of the target which are to be measured are on an inside surface, such as on the wall of a bore as small as 5 millimeters in diameter, the bore being defined in the target device. Other characteristics of these measurement requirements are large variations in the surface reflectivity of the features of the target which are to be measured and varying angles of incidence between the laser beam and the features of the target which are to be measured. Additionally, the acquisition of the beat signal must be very rapid in order to minimize the sensitivity of the measurements to vibration and noise from external sources.

A common method for making high resolution dimensional measurements of precision machined parts is based upon laser triangulation, as disclosed, for example, in U.S. Pat. No. 4,733,969. Such devices send a beam to the target and sense the return light along a different path which is at a fixed angle to the target beam path. The best laser triangulation sensors have a resolution of 250 nanometers, which is close to the theoretical limit for this technology. This is not adequate for measurements which need to be made for certification of cylindrical plug and ring gages, for example. Moreover, the need for widely separated paths for the target and return beams precludes this technology from being used for high resolution measurements of internal geometries on an inside surface, such as on the wall of a relatively small bore in the target device. U.S. Pat. No. 5,521,707 to Castore et al. discloses a method and apparatus for using a laser triangulation sensor to making dimensional measurements on the form of a threaded fastener.

Another method currently used in high resolution optical sensors is autofocusing. Commercially available autofocus sensors have resolutions as fine as 25 nanometers. Autofocus sensors operate by placing a detector at the focal point of a lens system. The distance of the target from the lens system focal point can be estimated by measuring the size of the image on the detector. Such sensors have the disadvantage for the type of application described above in that the response characteristics of the sensor vary significantly with the surface reflectivity of the part being measured. On highly diffuse surfaces the signal may disappear altogether. Moreover, the cone of light that must be reflected from the target back through the lens system to the detector means it is awkward, and often not possible, to configure this sensor for measuring internal geometries in small diameter bores.

Laser radar devices for precision measurement applications have been described by Goodwin, U.S. Pat. No. 4,830,486, and Slotwinski and Kenyon, U.S. Pat. No. 4,824,251. Goodwin, for example, discloses frequency modulating a laser, splitting the beam into reference and target components, recombining the beams to create a beat signal (heterodyning) and determining properties of the beat wave by analyzing a pattern of fringes obtained on a detector. Both patents describe fiber optic embodiments of the method. These devices have the disadvantage that they have no means to control the relative intensities of the reference and target signals, thus restricting their range of application to surfaces with similar reflectivity characteristics. They also have the disadvantage that the fringe analysis methods used to characterize the beat signal are relatively slow, resulting in greater sensitivity to vibration and noise from external sources.

The principle of operation of a frequency-modulated heterodyne interferometer for making high precision distance measurements is described in Chien et al., "Distance and velocity-detection interferometer by using a frequency-modulated triangular-modulated laser diode", Applied Optics, 1 Jun. 1995, Vol. 34, No. 16, (2853–2855), and Imai et al., "Optical-heterodyne displacement measurement using a frequency ramped laser diode", Optics Communications, 15 Aug. 1990, Vol. 18, No. 2, (113–117). These and similar instruments work well for measuring the displacement of ideal reflecting surfaces such as mirrors. The devices which have been demonstrated that are made in accord with the teachings of Chien et al. and Imai et al. and are slow, taking several seconds to integrate data to obtain a usable fringe image. This overly lengthy time for analysis results in these devices being very sensitive to alignment and vibration. When applied to the measurement of position of non-ideal surfaces such as anodized aluminum or the flanks of a thread, which are typically at a 30 degree angle of incidence to the interferometer beam, the signal to noise ratio becomes too small to make a reliable high resolution measurement.

As indicated above, the prior art shows that a number of frequency-modulated heterodyne interferometric systems have been experimentally developed for high precision measurement. None of these instruments has yet seen commercial application. The present invention addresses the shortcomings of these devices by incorporating in one system a novel method for dealing with variable reflectivity and alignment of targets, a means for accurately measuring inside surfaces, such as in small cavities and bores as small as 5 mm diameter, and an approach to reducing sensitivity to noise and vibration by reducing the time needed to make a measurement.

SUMMARY OF THE INVENTION

The principle of operation of this invention is based upon heterodyne interferometry. Heterodyning is the coherent superposition of two electromagnetic waves having the same polarization but different frequencies. It is also called optical mixing, in analogy with communications theory. If two optical signals are combined on a photodetector, a sum and difference beat frequency result. The sum frequency cannot be detected because it exceeds the detector's bandwidth. The difference frequency can be detected with a proper selection of photodiode, chirp frequency, and laser characteristics. The theory of frequency modulated laser radar is known.

The output frequency of a laser diode is chirped by modulating the input current of the laser. A portion of the frequency chirped signal is split off, using a beamsplitter, as a reference signal. The light in the reference arm passes through a variable intensity coupler and return to the beamsplitter. The remaining light travels to the target and is reflected from the target back to the beamsplitter and arrives at the beamsplitter after T seconds, where T is related to the distance through the following formula:

$$T = 2 \times \left( \frac{D}{c} \right)$$

where D is the distance to the target surface and c is the speed of light.

The returning light is optically mixed with the reference signal at the beamsplitter to create a sum and difference beat frequency. The difference beat frequency is detected by a high-speed photosensitive detector. The sum frequency is well beyond the bandwidth of the detector so is not detected. The laser must have sufficient coherence to produce a heterodyne signal after traversing the path length from the laser to the target surface and back to the optical mixer. The frequency of the beat signal is directly proportional to the distance of the target from the sensor. The following equation quantifies the relationship between the beat frequency and the distance to the target.

$$BF = \frac{2 \cdot LG}{c} \cdot PD$$

In the above equation BF is the beat frequency, PD is the optical path difference between the reference arm and the target arm, c is the speed of light, and LG is the gain in laser frequency which occurs as the result of modulating the current. Since the reference arm has constant length, changes in the beat frequency occur as a result of changes in the distance to the target.

The amplitude of the beat relative to the DC component of the carrier frequency is estimated by measuring the relative intensity of the reference and target signals. If the signal amplitude is too small, a signal is sent to a piezoelectric motor driving a variable intensity fiber optic coupler which results in a change in the amount of light returning in the reference arm. When the signal amplitude is within acceptable limits, a control signal is sent which shunts the signal from the photodetector to the beat frequency analysis electronics.

The beat frequency is measured to approximately 1 part per million by first gating the return signal to divide the return signal into time-sliced units approximately. The frequency of each gated portion is estimated. This can be done using either a digital phase-locked loop or a tap and delay line with a reference oscillator. The beat frequencies for the set of gated signals is compiled and a statistical analysis is performed to generate a number which is the range estimate and a number which is a range uncertainty estimate. This happens in approximately 1 millisecond.

The high frequency of the signal gating minimizes the effects of noise and vibration on the measurement. A typical gating period is 50 microseconds. For the mechanical system to which the sensor is attached to make dimensional measurements of fasteners, gears, or other parts the vibrations in the system typically have periods of 10 milliseconds and longer. Therefore they have minimal influence upon the sensor readings due to the much shorter periods needed for acquiring data.

The present invention is a method and apparatus for frequency-modulated heterodyne interferometric high precision metrology of a target, wherein a beat frequency is produced on a photodetector as a result of combining on said photodetector a reference optical signal and a target optical signal, the target optical signal being reflected from the target. The apparatus comprises a signal intensity detector. The signal intensity detector accommodates variable reflectivity and variable alignment of the target with respect to the interferometric system by maintaining the amplitude of the beat frequency relative to the reference optical signal.

DETAILED DESCRIPTION OF THE DRAWINGS

Figure 1:
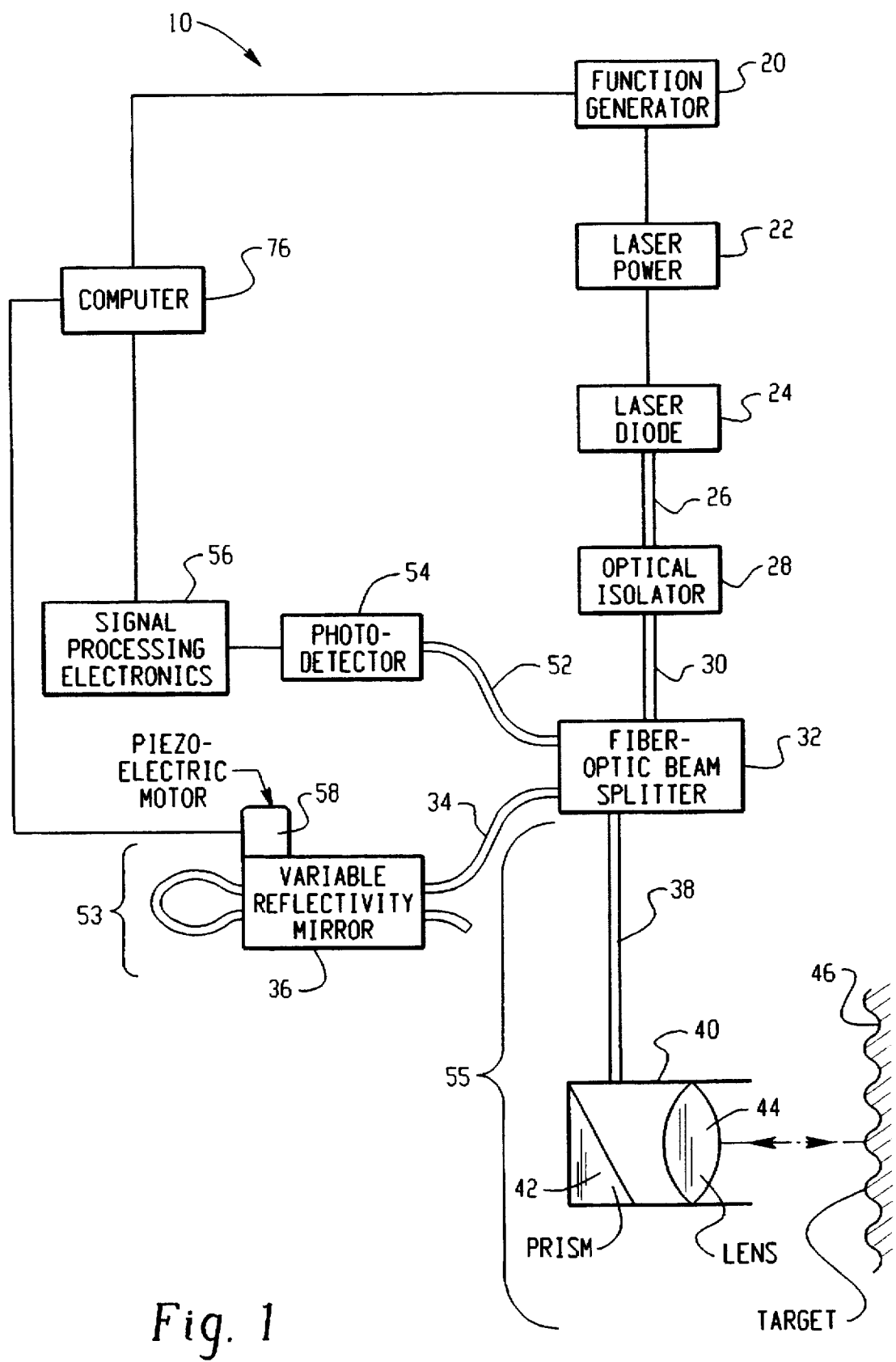
FIG. 1 is a detailed schematic block diagram of the preferred embodiment.

FIG. 1 is a schematic block diagram indicating the primary components of a preferred embodiment of the frequency modulated heterodyne interferometer of the present invention, shown generally at 10.

The interferometer 10 includes a function generator 20. The function generator 20 generates an output that is a voltage. The voltage output is preferably modulated as a sawtooth ramp or a sine wave. The sine wave voltage modulation is the easiest to generate and functions well. The modulated voltage output of the function generator 20 is provided as the input to the power unit 22.

The power unit 22 converts the modulated voltage input to a modulated current. The modulated current is used to power a laser diode 24 to generate an output light. Further, the power unit 22 contains a cooling element for the laser diode 24.

The laser diode 24 is a single mode laser. The laser diode 24 is optically coupled to a single mode polarization fiber 26. The light generated by the laser diode 24 enters the single mode polarization fiber 26 and passes through an optical isolator 28. The optical isolator 28 functions as a check valve to prevent any light that is downstream of the optical isolator 28 from passing through the optical isolator 28 and reentering the laser diode 24. The optical isolator 28 is optically coupled to an optical fiber 30. The optical fiber 30 is in turn optically coupled to a fiber optic beamsplitter 32. The light generated by the laser diode 24 passes from the optical isolator 28 through the optical fiber 30 to the fiber optic beamsplitter 32.

The fiber optic beamsplitter 32 is preferably a beamsplitter such as the model 904P produced by Canadian Instrumentation of 1155 Appleby Line, Burlington, Ontario, Canada 17L 5H9. The beamsplitter 32 divides the incoming light beam into two separate outgoing light beams. A first outgoing light beam is directed into the reference arm optical fiber 34 and a second light beam is directed into the target arm optical fiber 38.

The first outgoing light beam passes through the reference arm optical fiber 34 and is directed to a variable reflectance mirror 36. The variable reflectance mirror 36 is a mirror that is preferably the model 905P, also manufactured by Canadian Instrumentation.

The second light beam passes through the target arm optical fiber 38 to a lens assembly 40 that is preferably bonded to the distal end of the target arm optical fiber 38. The lens assembly 40 has a micro-optical mirror 42. The mirror 42 is disposed at a forty-five degree angle with respect to the longitudinal axis of the target arm optical fiber 38. A lens 44 is optically coupled to the micro-optical mirror 42 and acts to focus the light emitted therefrom. The lens assembly 40 emits the light beam at right angles to the longitudinal axis of the target arm optical fiber 38 toward the target 46. The nominal core diameter of the target arm optical fiber 38 is between 1.9 mm and 5.5 mm, with a preferred diameter of 3.5 mm. The diameter of the lens assembly 42 is between 2.0 mm and 6.0 mm, with a preferred diameter of 3.5 mm. This relatively small size and the right angle illumination combine to permit the ready measurement of the inner surfaces of cavities formed in the target 46, including the measurement of thread parameters in the inner surface of a bore formed in the target 46 by the insertion of the distal end of the target arm optical fiber 38 and the lens assembly 42 into such cavity.

The light beam illuminates the target 46 and is reflected therefrom. A portion of the illuminating light beam is reflected from the target and is received by the lens 44. After reception by the lens 44, the reflected light from the target 46 travels in the opposite direction through the same path as the illuminating beam that illuminated the target 46. The reflected light is transmitted through the lens 44 and the target arm optical fiber 38 back to the beamsplitter 32. At the beamsplitter 32, the reflected light from the target 46 in the target arm is combined with the light in the reference arm that is returned from the variable reflectance mirror 36. The combined light comprised of the reference light and the target light travels along the combined optical fiber 52 and interferes at the surface of the photodetector 54 to produce both a sum and a difference beat frequency. It should be noted that the sum beat frequency is outside of the band width of detection of the photodetector 54. Accordingly, only the difference beat frequency is detected.

The function of the variable reflectance mirror 36 is to maintain the ratio of intensities of the reflected reference and target beams. As the reflectivity characteristics of the target 46 change due to variations in surface finish, coatings, or angle of incidence of the beam to the portion of the target 46 being illuminated, the amount of light reflected back to the lens 44 from the target 46 can vary greatly. The relative magnitudes of the intensity of the beam reflected from the target and of the intensity of the light in the reference arm that is to be returned from the variable reflectance mirror 36 can become out of balance to the extent that the signal in the reference arm 53 has much greater energy than the signal in the target arm 55. This would be the case if an ordinary mirror of constant reflectance were used instead of the variable reflectance mirror 36. The relatively greater intensity of the signal in the reference arm 53 would reduce the amplitude of the beat signal relative to the reference signal to the point where the beat signal could not be distinguished from noise.

To account for this signal intensity imbalance situation, the signal processing electronics 56 estimates the relative amplitude of the reference and target signals. If the ratio deviates beyond a software programmable threshold, the computer actuates the motor drive 58 which controls the amount of light reflected by the variable reflectance mirror 36. In a preferred embodiment, the variable reflectance is achieved by positioning the butt ends of two optical fibers proximate and opposed to one another with the longitudinal axis of the two optical fibers being parallel. One optical fiber is held in a fixed position. The second optical fiber is moveable by the motor drive 58. The motor drive 58 effectively moves the longitudinal axis of the second optical fiber relative to the longitudinal axis of the first optical fiber while maintaining the parallel relationship in order to vary the intensity of the light transmitted from the second optical fiber to the first optical fiber. When the longitudinal axes of the two optical fibers are in alignment, the intensity of the light transmitted is the greatest.

Figure 2:
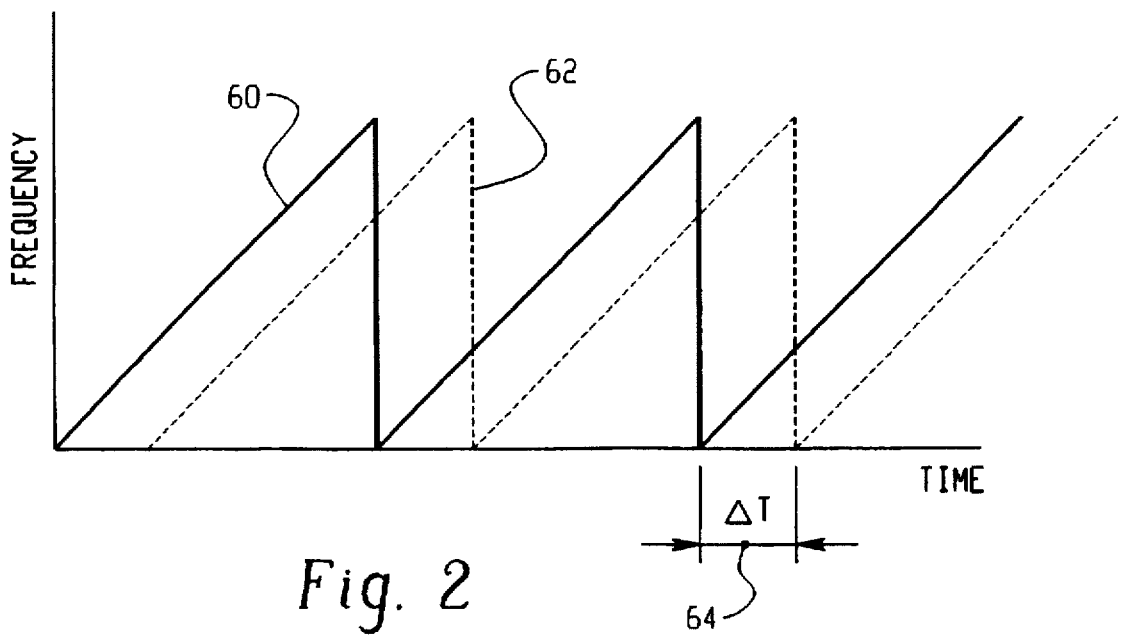
FIG. 2 is a graphical illustration of the relative frequency versus time characteristics of the outgoing signal and the signal received from the target.

FIG. 2 illustrates the relationship between the outgoing frequency modulated reference beam signal 60 and the incoming target beam signal 62 which has been reflected from the target 46. The temporal displacement 64 of the two signals 60, 62 is proportional to the path difference of the target and reference arms of the interferometer 10 according to the equation:

$$\Delta T = \frac{2}{c} \times (D_{ref} - D_{tgt})$$

Where:

c is the speed of light;

$D_{ref}$ is the optical path length in the reference arm; and $D_{tgt}$ is the optical path length in the target arm, including the distance from the lens 44 to the target 46 and back to the lens 44.

Figure 3:
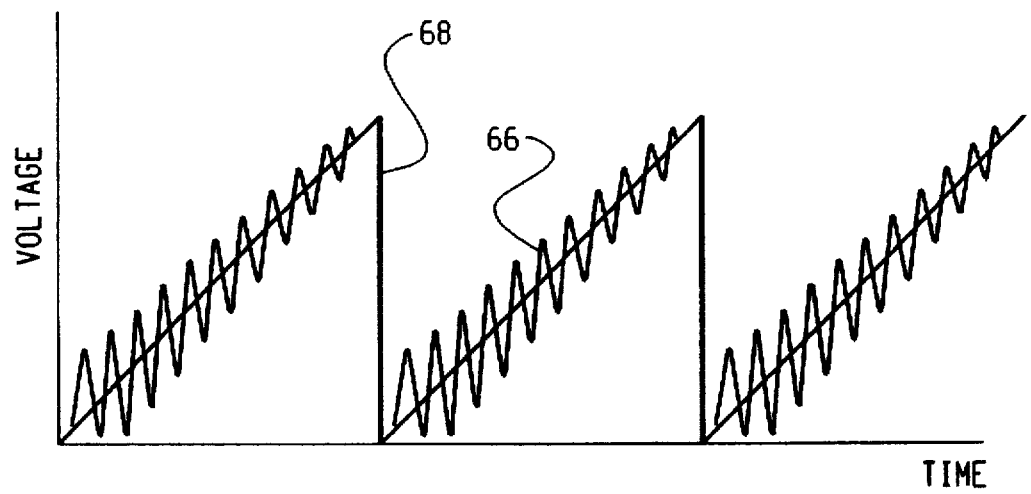
FIG. 3 is a graphical illustration of the beat signal output from the photosensitive detector.

The reflected light from the variable reflectance mirror 36 and the target 46 combine at the detector surface of the photo detector 54 to produce a beat signal as shown in FIG. 3. The beat signal 66 has a higher frequency than the frequency modulation wave 68. The beat signal 66 is depicted superimposed on the frequency modulation wave 68. The frequency modulation wave 68 is the voltage modulated signal generated by the function generator 20. The beat frequency is proportional to the optical path difference in the reference and target arms, and is given by the following formula:

$$BF = \frac{2 \times LG}{c} \times (D_{ref} - D_{tgt})$$

Where:

LG is the laser gain, the change in laser frequency caused by the modulation of the drive current;

c is the speed of light;

$D_{ref}$ is the optical path length in the reference arm; and $D_{tgt}$ is the optical path length in the target arm, including the distance from the lens 44 to the target 46 and back to the lens 44.

Figure 5:
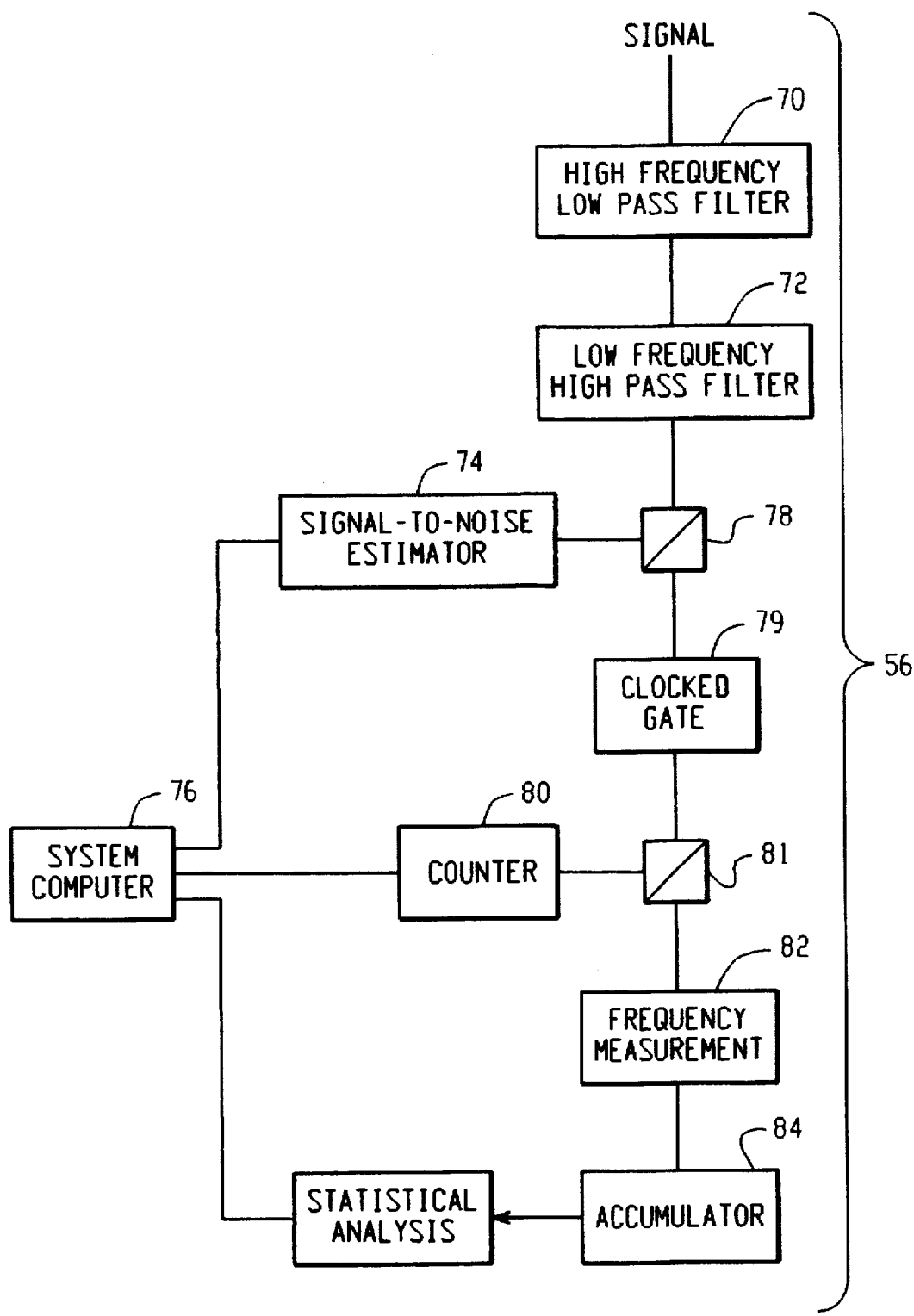
FIG. 5 is a block diagram illustrating the components involved in the processing of the beat signal and in the control of the intensity of light returned in the reference arm of the interferometer.

FIG. 5 is a schematic block diagram showing the basic signal processing functions provided by the signal processing electronics 56 and the computer 76 which determine the beat frequency to a very high accuracy. With the preferred embodiment, the accuracy of the beat frequency is determined to about 1 part per million. The output signal of the photodetector 54 is sent through a high frequency, low pass filter 70 to remove high frequency noise. The signal is then sent through a low frequency high pass filter 72 which removes the carrier wave (the frequency modulation wave 68) from the signal. The amplitude of the resulting signal is measured in the signal-to-noise estimator circuit 74, controlled by the computer 76. If the signal amplitude is acceptable as determined by the computer 76, the switch 78 is set to the open configuration and the signal passes to a clocked gate circuit 79 which gates, or time slices, the signal into segments which are approximately as long in time as the frequency modulation period.

The average frequency for each time-sliced segment is estimated in the frequency measurement circuit 82. This can be implemented by using a phase lock loop, a tap-delay line with multiple taps, or measuring the period directly using a high frequency reference oscillator.

The counter 80 counts the number of time-sliced segments passed by the clocked gate 79. When the number of segments is less than a pre-programmed limit, the switch 81 remains open. When the number of segments equals the limit, the switch 81 is closed.

The frequency estimate for each time slice is stored in an accumulator 84, or segment of memory of the computer 76. The mean and standard deviation of the values in the accumulator 84 are computed in the statistical analysis module 86. The mean and standard deviation of the values are used to produce a range estimate (mean) to the target 46 and a standard uncertainty value (standard deviation).

Figure 4:
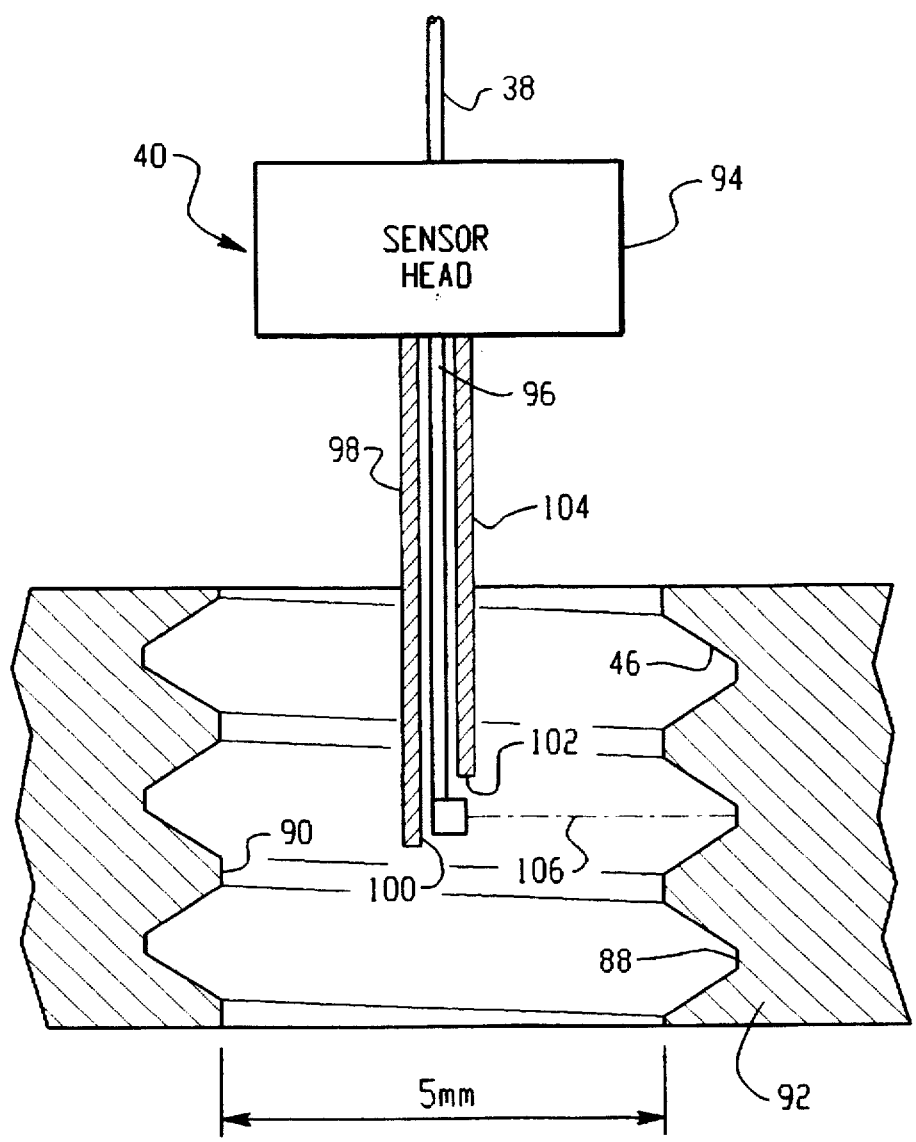
FIG. 4 is an illustration of the relative position of the fiber optic head and a target comprising a screw thread during the measurement process.

FIG. 4 shows the relative position of the lens assembly 40 and a target 46 for measurement, the target 46 comprising, for example, a portion of an internal thread 88. The internal thread 88 is defined on the inner wall of a bore 90 defined in a target device 92. The bore 90 may be approximately 5 mm in diameter.

The lens assembly 40 is optically coupled to the target arm optical fiber 38. The lens assembly 40 has a sensor head 94. The sensor head 94 optically couples the target arm optical fiber 38 to an optical fiber 96. The optical fiber 96 is of the single mode polarization preserving type of fiber. The fiber 96 has a diameter in the range of 1.9 mm to 5.5 mm, with a preferred diameter of 3.5mm. The optical fiber 96 is disposed within a small diameter protective casing 98. The protective casing has a diameter ranging from 3.9 mm to 7.5 mm. The protective casing 98 has a proximate end coupled to the sensor head 94. In a preferred embodiment, the distal end of the protective casing 98 is open at 100 and has a further side opening 102 defined in the casing wall 104 proximate the distal end of the protective casing 98. The side opening 102 and the end opening 100 may be merged to form a single aperture proximate the distal end of the protective casing 98.

The micro optics assembly 105 is preferably bonded to the end of the optical fiber 96. The micro optics assembly 105 bends the target illuminating beam of light 106 at right angles to the optical fiber 96 by means of the mirror 42, depicted in FIG. 1. Micro optics lens assembly 105 further focuses the target illuminating beam of light 106 on the target 46 by means of the lens 44, depicted in FIG. 1. Measurements can thereby be made inside very small cavities, such as bore 90.

The micro optics assembly 105 is translatable along the axis that is transverse to the axis of the target illuminating beam of light 106 so that the full dimensions of, in this case, the threads of the target 46 are measurable. As the micro optics assembly 105 moves axially along the target 46, the angle of incidence of the target illuminating beam of light 106 and the thread form comprising the target 46 will change. As the angle of incidence changes, the signal intensity of the reflected signal in the target arm changes because less or greater light is reflected back into the lens 44. The variable reflectance mirror 36 accounts for such changes, as previously described, to maintain a near balance between the signal intensities in the reference and target arms.

There are modifications to this preferred implementation which are well understood by those practiced in the art. For example, two detectors can be used to measure the beat signal. The readings for the two detectors can be compared to remove common mode noise.

Although the present invention has been described with reference to a preferred embodiment, workers skilled in the art will recognize that changes may be made in form and detail without departing from the spirit and scope of the invention.

I claim:

1. A frequency-modulated heterodyne interferometric system for high precision metrology of a target, wherein a beat frequency is produced on a photodetector as a result of combining on said photodetector, a reference optical signal and a target optical signal, the target optical signal being reflected from the target, the system comprising:

signal intensity detection means for accommodating variable reflectivity and variable alignment of the target with respect to the interferometric system by maintaining the amplitude of the beat frequency relative to the reference optical signal, and for estimating the signal-to-noise ratio of the beat frequency by measuring the relative intensity of the reference optical signal and the target optical signal, and a fiber optic path for conveying the reference optical signal to the photodetector, the fiber optic path having a variable intensity fiber optic coupler interposed therein, the variable intensity fiber optic coupler having an actuator for selecting a level of intensity of the reference optical signal conveyed to the photodetector.

2. A frequency-modulated heterodyne interferometric system as claimed in claim 1 wherein the level of intensity of the reference optical signal conveyed to the photodetector is varied as a function of the intensity of the target optical signal.

3. A frequency-modulated heterodyne interferometric system as claimed in claim 2 further including beat frequency analysis means communicatively coupled to the photodetector for analyzing the beat frequency to calculate a distance to a portion of the target and having a controllable shunt being interposed between the photodetector and the beat frequency analysis means for controlling the communications therebetween, the shunt effecting said communications responsive to the existence of an acceptable signal-to-noise ratio of the beat frequency.

4. A frequency-modulated heterodyne interferometric system as claimed in claim 1 wherein the variable intensity fiber optic coupler is a variable reflectance mirror.

5. A frequency-modulated heterodyne interferometric system as claimed in claim 1 further including a laser diode for emitting a frequency modulated light signal and a function generator, the function generator being communicatively coupled to the laser diode and providing a modulated input current signal to the laser diode, the modulated input current signal effecting the frequency modulation in the emitted frequency modulated light of the laser diode.

6. A frequency-modulated heterodyne interferometric system as claimed in claim 5 wherein the modulation of the input current signal to the laser diode has a modulation selected from the following types of modulation:

saw-tooth modulation, and sine wave modulation.

7. A frequency-modulated heterodyne interferometric system as claimed in claim 1 further including a target illuminating optical path for illuminating the target with an optical signal, the target optical signal being reflected from the target through the target illuminating optical path.

8. A frequency-modulated heterodyne interferometric system for high precision metrology of a target, comprising:

a function generator having a voltage modulated signal output;

a laser being communicatively coupled to the function generator and converting the voltage modulated signal received from the function generator to a current modulation and outputting a current modulated optical signal;

a beamsplitter being communicatively coupled to the laser and receiving the current modulated optical signal therefrom, dividing the current modulated optical signal into an optical reference signal and an optical target signal;

a reference arm optical fiber being communicatively coupled to the beamsplitter and receiving the optical reference signal therefrom;

signal intensity detection means for accommodating variable reflectivity and variable alignment of the target with respect to the system being communicatively coupled to the reference arm optical fiber and receiving the optical reference signal therefrom and communicating an optical reference signal of selected intensity to the beamsplitter;

a target arm optical fiber being communicatively coupled to the beamsplitter and receiving the optical target signal therefrom and directing the optical target signal to illuminate at least a portion of the target and receiving a reflected target optical signal from the illuminated at least a portion of the target, the reflected target optical signal being communicated to the beamsplitter, the reflected target optical signal and optical reference signal of selected intensity combining to define a beat frequency having a desired signal-to-noise ratio; and a photodetector being communicatively coupled to the beamsplitter and receiving the beat frequency having the desired signal-to-noise ratio therefrom.

9. A frequency-modulated heterodyne interferometric system as claimed in claim 8 wherein the signal intensity detection means accommodates variable reflectivity and variable alignment of the target with respect to the interferometric system by maintaining the amplitude of the beat frequency relative to the reference optical signal.

10. A frequency-modulated heterodyne interferometric system as claimed in claim 8 wherein the signal intensity detection means estimates the signal-to-noise ratio of the beat frequency by measuring the relative intensity of the reference optical signal and the target optical signal.

11. A frequency-modulated heterodyne interferometric system as claimed in claim 10 further including a fiber optic path for conveying the reference optical signal to the photodetector, the fiber optic path having a variable intensity fiber optic coupler interposed therein, the variable intensity fiber optic coupler having an actuator for selecting a level of intensity of the reference optical signal conveyed to the photodetector.

12. A frequency-modulated heterodyne interferometric system as claimed in claim 11 wherein the level of intensity of the reference optical signal conveyed to the photodetector is varied as a function of the intensity of the target optical signal.

13. A frequency-modulated heterodyne interferometric system as claimed in claim 12 further including beat frequency analysis means communicatively coupled to the photodetector for analyzing the beat frequency to calculate a distance to a portion of the target and having a controllable shunt being interposed between the photodetector and the beat frequency analysis means for controlling the communications therebetween, the shunt effecting said communications responsive to the existence of an acceptable signal-to-noise ratio of the beat frequency.

14. A frequency-modulated heterodyne interferometric system as claimed in claim 11 wherein the variable intensity fiber optic coupler is a variable reflectance mirror.

15. A frequency-modulated heterodyne interferometric system as claimed in claim 11 wherein the target arm optical fiber includes:

a single mode polarization preserving fiber; and an elongate protective casing substantially enclosing the single mode polarization preserving fiber and having a proximate end and a distal end, the distal end having a side-looking aperture defined therein.

16. A frequency-modulated heterodyne interferometric system as claimed in claim 15 wherein the single mode polarization preserving fiber of the target arm optical fiber has a diameter between 1.9 and 5.5 mm and the protective casing has a diameter between 3.9 and 7.5 mm.

17. A frequency-modulated heterodyne interferometric system as claimed in claim 15 wherein the target arm optical fiber further includes the single mode polarization preserving fiber having a longitudinal axis and a distal end, the optical signal being projected therefrom orthogonally with respect to the longitudinal axis of the single mode polarization preserving fiber.

18. A frequency-modulated heterodyne interferometric system as claimed in claim 17 wherein the target arm optical fiber further includes the single mode polarization preserving fiber distal end being disposed proximate the distal end of the protective casing and having a micro-optics assembly optically coupled to the distal end of the single mode polarization preserving fiber, the micro-optics assembly bending the optical signal orthogonal to the longitudinal axis of the single mode polarization preserving fiber, projecting the optical signal through the side-looking aperture defined in the protective casing, and focusing the optical signal on the target.

19. A frequency-modulated heterodyne interferometric system as claimed in claim 18 further including processing means coupled to the photodetector for calculating the distance from the target arm optical fiber to the target.

20. A frequency-modulated heterodyne interferometric system as claimed in claim 19 wherein said processor means determines the beat frequency according to the formula:

$$BF = (2 \times LG/c) \times (D_{ref} - D_{tgt})$$

BF being the beat frequency, LG being the laser gain, the change in laser frequency caused by the current modulation of the optical signal, c being the speed of light, $D_{ref}$ being the optical path length of the reference arm, and $D_{tgt}$ being the optical path length of the target arm.

* * * * *